Feb. 27, 1968  A. K. A. WAHEED ET AL  3,370,985
AIR DEPOLARISED CELL WHEREIN A POROUS CATHODE ELEMENT
COMPRISES ACTIVATED VEGETABLE CHARCOAL
Filed Sept. 29, 1965

United States Patent Office 3,370,985
Patented Feb. 27, 1968

3,370,985
AIR DEPOLARISED CELL WHEREIN A POROUS CATHODE ELEMENT COMPRISES ACTIVATED VEGETABLE CHARCOAL
Abdul Khader Abdul Waheed, Konkanchi Venkata Narayan Rao, and Kadarundalige Sitaramdoss Gururaja Doss, Karaikudi, India, assignors to Council of Scientific and Industrial Research, New Delhi 1, India, an Indian registered body incorporated
Filed Sept. 29, 1965, Ser. No. 491,160
6 Claims. (Cl. 136—86)

This invention relates to carbon electrodes for use in air depolarised cells.

The well-known air depolarised cell is a primary type of cell which utilizes the oxygen of the air as the cathode component and consists of porous carbon as the cathode element through which oxygen (air) circulates and takes part in the reaction, zinc as the anode and sodium hydroxide as the electrolyte. The air depolarised cell has an open circuit voltage of 1.40–1.45 volts; it operates at 1.10–1.20 volts and has a constant voltage discharge curve for the entire service period at normal discharge rates. The cell is designed to be assembled in the field.

The air depolarised cell has several civil and military applications such as for railway and marine signalling and switch lamp lighting, for telephone and other general instrument operations and for emergency lighting.

The conventional carbon electrodes for use in air depolarised cells are made from selected charcoal or graphite, employing volatile compounds as binders, and they are made by a process which involves four steps, viz blending, pressing, baking and waterproofing.

This invention has for its main object improvements whereby a carbon electrode for the purpose may be made more economically, from indigenously available carbon.

With this object in view, this invention in its broadest aspect consists of a porous carbon electrode, particularly for use in air depolarised cells, which electrode has activated vegetable charcoal as its main constituent and a high polymer waterproof agent as its binder.

Such a carbon electrode may have acetylene black as an additional constituent thereof, in a proportion of 5 to 15% weight for weight.

We have found that a carbon electrode made from coconut shell charcoal meets the requirements of a carbon electrode of a high character for use in an air depolarised cell. Our work has, however, shown that a suitable porous carbon electrode for air depolarised cells, requiring low current drains, can also be made from other activated vegetable charcoals such as paddy husk charcoal and groundnut shell charcoal.

The active carbon for a carbon electrode according to this invention is preferably prepared by a method which involves only two steps, viz a first step in which the raw material is carbonized, usually in the absence of air, at a temperature below 600° C., and a second step in which the adsorptive powers of the residual char after carbonization are improved by ignition at elevated temperatures to remove volatile impurities.

Any other known method of activation also may, however, be employed for the preparation of the active vegetable charcoal.

The high polymer water-proofing agent may be a binding agent of the polymethyl methacrylate and it may be present in a ratio of 1.5 to 3% of the mass of the electrode.

This invention includes also a process of making a porous carbon electrode wherein activated vegetable carbon in powder form is mixed with a high polymer waterproofing binding agent, the mix is pressed in the form of an electrode at a pressure of about ¼ to ½ ton per square inch, and the pressed electrode is allowed to weather dry in the atmosphere before it is removed from the mould.

In carrying out the said method, activated coconut shell charcoal in a powdered form between −100 and +140 mesh may be employed as the activated vegetable carbon.

This invention will now be more particularly described with reference to the accompanying drawings, wherein.

Figure 1:
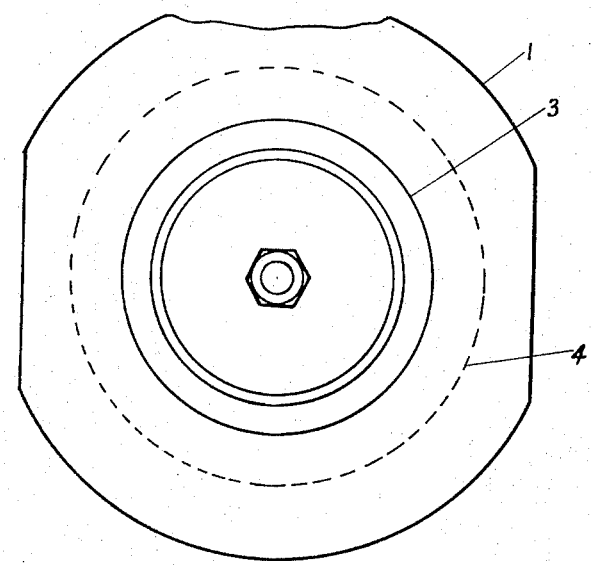
FIG. 1 is the top view of a carbon electrode according to this invention.
Figure 2:
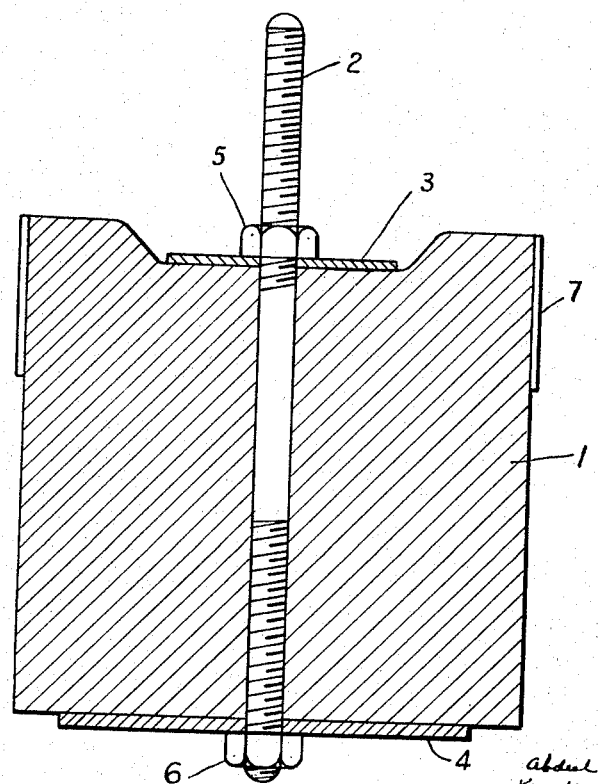
FIG. 2 is its sectional elevation.

The electrode illustrated in the drawing consists essentially of a block 1 of active vegetable charcoal, having a central steel rod 2 for fixing an electric contact therein, a small mild steel disc 3 on its top and a larger mild steel disc 4 at its bottom. The said steel rod 2 and the said steel discs 3 and 4 are nickel plated. The said steel discs 3 and 4 kept in contact with the electrode by means of the nuts 5 and 6.

A seamless plastic or rubber ring 7 about 2″ wide and ⅙″ thick is inserted around the top portion of the electrode and a wax coating is given at the lower end of the said plastic or rubber ring in order to avoid seepage of the electrolyte to the top surface of the carbon electrode when it is assembled in an air depolarised cell.

The active carbon block 1 of the said electrode is prepared as follows:

A blend consisting of activated vegetable carbon (such as activated coconut shell charcoal) in powdered form, preferably between −100 mesh and +140 mesh size, and a small percentage of acetylene black (ranging from 5 to 15 percent but preferably 10 percent wt./wt.), to which polymethyl methacrylate (ranging from 1.5–3.0 percent, preferably 3 percent of the mass of the electrode) dissolved in a suitable solvent( such as benzene or trichlorethylene) had been added, was used for making the electrode. The addition of high polymer in ratio of less than 1.5% tends to affect the mechanical strength adversely whereas a ratio of greater than 3% tends to increase the resistance.

Approximately 720 gms. of activated coconut shell charcoal and approximately 80 gms. of acetylene black were mixed using a blender (mixing machine), with the addition of about 25 gms. of polymethyl methacrylate dissolved in about 500 cc. of a suitable solvent (such as benzene or trichlorethylene). The carbon mix was then pressed in the form of an electrode at a pressure of about ¼ to ½ ton per square inch in the hydraulic press, using a mould such as one made of wood. After pressing, the electrode "in situ" was allowed to weather-dry in the atmosphere before removal from the mould.

An air depolarised cell as aforesaid, when assembled in the form of the special railway type cell, gives an open circuit voltage of 1.40 to 1.45 volts and a short circuit current of about 6 amperes. It also meets the following typical set or requirements:

0.06 ampere for 30 minutes each and 30 times a day
3.0 ampere for 15 seconds each and 30 times a day, and
0.17 ampere continuous discharge all the 24 hours until 500 ampere hours designed capacity is realised.

NOTE: Evaluation of carbons (without acetylene black): Experiments on the evaluation of active carbons without any admixture of acetylene black have shown that out of various varieties of active carbon, the electrode element made from coconut shell charcoal when incorporated in the Railway type air depolarised cell, gives the highest short circuit current and offers the lowest resistance. For example, values of short circuit current 1.8 amperes, resistance of a block of coconut shell charcoal with 3% polymethyl methacrylate as binder (3 x 2.6 cm. diameter size), 12 ohms are obtained for coconut shell charcoal as compared to the values of short circuit current ranging from a few milliamperes to a maximum of 800 milliamperes and resistance (under identical conditions) ranging from 57 ohms to 125 kilohms for the other varieties of active carbon.)

Thus the coconut shell charcoal (without any admixture of acetylene black) though the best of the indigenously available active carbons, when assembled in the form of railway type cell, while it fulfils the two requirements namely intermittent discharge at 0.06 ampere for 30 minutes each and 30 times a day and continuous discharge at 0.17 ampere for all the 24 hours (until 500 ampere hours are obtained) does not meet another requirement namely 3.0 amperes for 15 seconds each and 30 times a day.

Thus, the present invention is attended with the following advantages:

(i) The porous carbon element of an air depolarised cell can be made from indigenously available vegetable carbon.

(ii) As the binder used for preparing the electrode is itself a waterproofing agent, the method of preparing the electrode is considerably simplified by the elimination of two of the four steps of the conventional method, i.e. by the elimination of the steps of baking and waterproofing.

(iii) The simplification of the method as aforesaid, dispenses with the need of costly equipment the only equipment required being a mixer and a hydraulic press.

(iv) On the whole the manufacture of the electrode having the requisite properties is rendered considerably more economical.

What we claim is:

1. A porous carbon electrode for use in an air depolarised cell comprising activated vegetable charcoal having a particle size between −100 and +140 mesh and 1.5–3 percent by weight of said electrode of polymethyl methacrylate binder.

2. A porous carbon electrode as claimed in claim 1 further comprising 5–15 percent by weight of said electrode of acetylene black.

3. A porous carbon electrode as claimed in claim 1 wherein said activated vegetable charcoal is taken from the group consisting of coconut shell, paddy husk and groundnut shell charcoals.

4. A process of making a porous carbon electrode for use in an air depolarised cell comprising intimately mixing together activated vegetable charcoal having a particle size between −100 and +140 mesh and 1.5–3 percent by weight of polymethyl methacrylate dissolved in a solvent taken from the group consisting of benzene and trichlorethylene, shaping said mixture into the form of an electrode, applying a pressure of between ¼–½ ton per square inch to said shaped mixture and allowing said compressed shaped mixture to dry under atmospheric conditions before being removed from the mold.

5. A process as claimed in clam 4 wherein 5–15 percent of acetylene black is mixed with said activated vegetable charcoal and polymethyl methacrylate.

6. An air depolarised cell wherein a porous cathode element comprises activated vegetable charcoal having a particle size between −100 and +140 mesh and 1.5–3 percent by weight of said electrode of polymethyl methacrylate binder, said cathode element being capable of transmitting air into the cell.

References Cited

UNITED STATES PATENTS

| | | | |
|---|---|---|---|
| 2,934,509 | 4/1960 | Crissey et al. | 260—41 |
| 1,497,544 | 6/1924 | Chaney | 136—121 |
| 2,566,105 | 8/1951 | Zert | 136—122 |
| 2,782,180 | 2/1957 | Weidman | 136—122 |
| 3,082,284 | 3/1963 | Mount | 136—122 |
| 3,235,473 | 2/1966 | LeDuc | 136—120 |

ALLEN B. CURTIS, *Primary Examiner.*

WINSTON A. DOUGLAS, *Examiner.*

A. SKAPARS, *Assistant Examiner.*